(12) United States Patent
Heinilä

(10) Patent No.: US 6,799,055 B2
(45) Date of Patent: Sep. 28, 2004

(54) METHOD OF RECEIVING SPREAD SPECTRUM SIGNAL, AND RECEIVER

(75) Inventor: Marko Heinilä, Vantaa (FI)

(73) Assignee: Nokia Networks Oy, Espoo (FI)

( * ) Notice: Subject to any disclaimer, the term of this patent is extended or adjusted under 35 U.S.C. 154(b) by 481 days.

(21) Appl. No.: 09/912,302

(22) Filed: Jul. 26, 2001

(65) Prior Publication Data

US 2002/0010002 A1 Jan. 24, 2002

Related U.S. Application Data

(63) Continuation of application No. PCT/FI00/01115, filed on Dec. 19, 2000.

(30) Foreign Application Priority Data

Dec. 20, 1999 (FI) ............................................. 19992734

(51) Int. Cl.[7] .................................................. H04B 7/00
(52) U.S. Cl. ......................... 455/526; 455/132; 455/137
(58) Field of Search ................................. 455/526, 403, 455/130, 132, 133, 137, 146; 375/147, 148, 152, 139, 136, 267, 130

(56) References Cited

U.S. PATENT DOCUMENTS

| | | | | |
|---|---|---|---|---|
| 5,757,853 A | * | 5/1998 | Tsujimoto | 375/141 |
| 5,926,502 A | * | 7/1999 | Schilling | 375/138 |
| 5,950,131 A | | 9/1999 | Vilmur | |
| 5,999,560 A | * | 12/1999 | Ono | 375/148 |
| 6,141,332 A | * | 10/2000 | Lavean | 370/335 |
| 6,229,840 B1 | * | 5/2001 | Ichihara | 375/147 |
| 6,232,927 B1 | * | 5/2001 | Inoue et al. | 343/844 |
| 6,370,182 B2 | * | 4/2002 | Bierly et al. | 375/140 |
| 6,480,526 B1 | * | 11/2002 | Shoki et al. | 375/147 |
| 6,625,202 B1 | * | 9/2003 | Sudo et al. | 375/147 |

FOREIGN PATENT DOCUMENTS

| | | |
|---|---|---|
| DE | 199 22 248 | 12/1999 |
| EP | 729 240 | 8/1996 |

OTHER PUBLICATIONS

Fukawa et al., "BER Performance of Orthogonalizing Matcher Filter)OMF) in Mobile DS CDMA Systems," NTT Mobile Communications Network, Inc., 1995.
Steiner et al., "A Comparison of Uplink Channel Estimation Techniques for MC/JD–CDMA Transmission Systems, "Deutsche Telecom AG, Technologiezentrum Darmstadt, 1998.

* cited by examiner

*Primary Examiner*—Sonny Trinh
(74) *Attorney, Agent, or Firm*—Pillsbury Winthrop LLP

(57) ABSTRACT

A RAKE receiver for receiving a spread spectrum signal, the RAKE receiver comprising at least two antennas for receiving a spread spectrum signal containing several user signals, at least one delay unit for delaying the spread spectrum signal received in at least one antenna to prevent the spread spectrum signals received from the different antennas from being cancelled, an adder for combining the spread spectrum signal received in at least two antennas to form a combination signal, and a matched filter for generating a user signal combination impulse response by means of the combination signal.

17 Claims, 8 Drawing Sheets

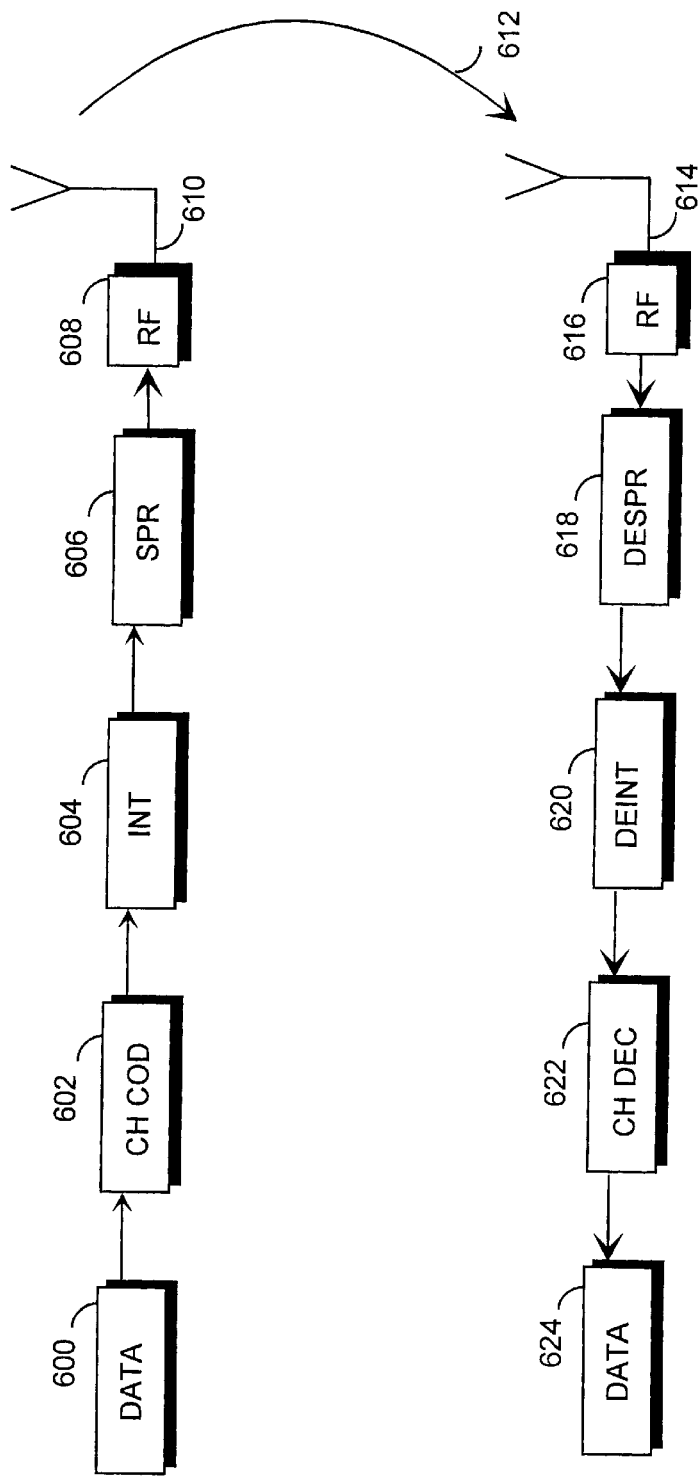

METHOD OF RECEIVING SPREAD SPECTRUM SIGNAL, AND RECEIVER

This is application is a Continuation of International Application PCT/FI00/01115 filed Dec. 19, 2000 which designated the U.S. and was published under PCT Article 21(2) in English.

FIELD OF THE INVENTION

The invention relates to a method and a receiver for receiving a spread spectrum signal in a radio system employing the code division multiple access method.

BACKGROUND OF THE INVENTION

In mobile systems, information is transferred between a mobile network and a mobile station by means of radio resources. The radio resources of a mobile network are defined in different ways depending on the multiple access method of the system. Those using the frequency division multiple access (FDMA) method are distinguished from each other on the basis of the frequency used. In radio networks using the time division multiple access (TDMA) method, several users are able to communicate in the same frequency band, in which users are distinguished from each other in time by dividing the information transmitted or received into timeslots. In radio systems using the code division multiple access (CDMA) system, several transmitting and receiving stations communicate simultaneously in the same frequency band of the radio spectrum. A spreading code for spreading the information in a base band signal is reserved for each user for the duration of a connection. The receiver of the signal, in turn, is able to identify the information transmitted by the user by decoding is using a corresponding despreading code. Compared with other systems using multiple access methods, the advantages of CDMA include efficient utilization of a frequency band and system data security. A disadvantage is that users operating in the same frequency band interfere with each other's transmissions because spreading codes and despreading codes are not orthogonal and transmitters are not mutually synchronized.

In addition to the interference caused by users to each other, for example the shapes of the surrounding terrain interfere with transmissions of information on the radio path. Multipath propagation means that, when propagating, a user signal is reflected from various points causing components from the same signal to arrive at a receiver at various delays. The multipath propagated signal components may cause fading, for example, in a situation when a signal is reflected from two adjacent objects. When the fading is significant, the reception of the signal fails altogether. This problem can be avoided for example by implementing the transmission on a radio channel by means of frequency hopping, whereby the transmission frequency is changed for each burst. In channel coding, the data to be transmitted are coded with a coding algorithm, allowing the authenticity of the coding and, consequently, of the received data to be verified at the receiving end. When transmitted interleaved, the data are divided into several bursts, whereby the loss of one burst is not fatal to the transmission of speech, for example. Furthermore, the receiver can be implemented with more than one antenna to gain antenna diversity, whereby the loss of a signal in one antenna is not fatal to the reception of the signal; instead, another antenna can receive the signal. The implementation of antenna diversity sets high requirements on the apparatus used, wherefore in practice it is preferably implemented in a base station of a mobile network.

In a RAKE type of CDMA receiver, multipath propagation may be utilized such that components that are delayed in various ways are received and combined to achieve optimal user signal identification. In a RAKE receiver, a delay profile, i.e. impulse response, is typically generated for a radio channel. A matched filter (MF), for example, can be used to generate the impulse response. A matched filter is used for example for information received on a pilot channel or in the pilot sequence of a radio burst. Pilot symbols are a group of symbols known to the receiver and transmitter, whereby the receiver of the information, being aware of what the received information should have contained, is able to make an estimate of the quality of the radio channel. A matched filter is shifted over the received information for example one half of a spreading code unit (chip) at a time, and the reception power is measured always when the matched filter synchronized with the received information. This allows an impulse response graph containing information on the signal strengths and delays of the multipath propagated components to be formed for the multipath propagated components of the received radio channel.

Let us assume that the measuring period of the impulse response is divided into N sequences of the length of L chips, the length of the measuring period being $NLT_c$, wherein $T_c$ is the duration of a chip. An impulse response estimate $P_i^{(a)}(t)$ is generated for each sequence $i=0, \ldots, N-1$ of length L, and antenna $0, \ldots, N_a -1$ in accordance with formula (1):

$$P_i^{(a)}(t) = \left| \frac{1}{L} \sum_{j=0}^{L-1} \gamma^{(a)}((iL+j)T_c + t) c_{iL+j}^* \right|^\alpha, \text{ wherein} \quad (1)$$

$\gamma^{(a)}(t)$ is a signal received from antenna a, $c_i^*$ is a spreading code and a is either 1, corresponding to an absolute value or 2, corresponding to squaring. The spreading code may be a real or complex value. The denotation $c_i^*$ refers to the complex conjugate of a complex spreading code. The final power intensity for antenna a as a function of the propagation delay t is given as an incoherent mean over N measuring periods according to formula (2):

$$P^{(a)}(t) = \frac{1}{N} \sum_{i=0}^{N-1} P_i^{(a)}(t). \quad (2)$$

In a prior art receiver based on antenna diversity, each antenna branch has a matched filter, on the basis of which symbol estimates are separately and independently generated for a user signal irrespective of the other antenna branches. By combining the generated symbol estimates, better estimates for the symbols transmitted in the user signal are obtained than by generating the symbol estimates on the basis of a signal received in one antenna only. Said matched filter can be implemented for example time dividedly, allowing the matched filter's processing capacity to be shared by several users. The processing capacity of a matched filter may also be divided time dividedly between antennas, allowing, in the case of for example two antennas, a user to be received during a first reception timeslot in a first antenna, antennas to be changed and the user received during the next reception time-slot in another antenna. Other users would be received in the following time-slots, until it is again said user's turn, who is first received in antenna one and then in antenna two. The code phases of the RAKE branches are selected using the impulse response $P^{(a)}{}_{(t)}$ measured for the antenna or the mutual impulse response of antennas directed to the same sector in accordance with formula (3).

$$P^{(a)}(t) = \frac{1}{N_a} \sum_{a=0}^{N_a-1} P^{(a)}(t). \quad (3)$$

The prior art solution for the reception along several antennas in a receiver involves significant drawbacks. A reception solution where the antennas used for receiving a user signal are changed at given intervals is not well applicable to the reception of a radio channel containing fading. For example in the case of a time-divided matched filter, when antennas are changed for the user at given reception timeslots, the problem is that the reception time for each antenna becomes short. Accordingly, when hitting said short timeslot, a fading gap significantly disturbs the reception of the signal. In this case the averaging time of the impulse response becomes short, emphasizing the harmful effect of a fading gap in the generation of the impulse response. Furthermore, in a matched filter where reception antennas are changed at intervals of reception timeslots, a processing delay is caused during change of antennas when the matched filter synchronizes with the new antenna.

BRIEF DESCRIPTION OF THE INVENTION

The object of the invention is thus to provide an improved method and apparatus for receiving a signal in a radio system. This is achieved by the method of receiving a spread spectrum signal in a cellular radio network to be described next. The method comprises receiving a spread spectrum signal containing several user signals in two or more antennas of a receiver in a cellular radio network, delaying the spread spectrum signal received in at least one antenna to prevent the spread spectrum signals received from the different antennas from being cancelled, combining the spread spectrum signal received in at least two antennas to form a combination signal, and generating a user signal combination impulse response by means of the combination signal.

The invention also relates to a RAKE receiver for receiving a spread spectrum signal. The RAKE receiver comprises at least two antennas for receiving a spread spectrum signal containing several user signals, at least one delay unit for delaying the spread spectrum signal received in at least one antenna to prevent the spread spectrum signals received from the different antennas from being cancelled, an adder for combining the spread spectrum signal received in at least two antennas to form a combination signal, and a matched filter for generating a user signal combination impulse response by means of the combination signal.

The invention relates to a method and receiver for receiving a spread spectrum signal in a radio system applying the code division multiple access method. The radio system is preferably a mobile telephone system, but the invention is, however, not restricted thereto. The receiver is preferably of the RAKE type, where a RAKE branch can be allocated to the reception of each multipath propagated signal component. The receiver of the invention is a receiver applying antenna diversity, i.e. there are at least two reception antennas. The receiver of the invention is preferably implemented in a base station of a mobile system, where the implementation of antenna diversity is most practical.

A spread spectrum signal contains user signals spread with several different user spreading codes. In the receiver of the invention, a spread spectrum signal is received in two or more antenna branches, the signals received from which are delayed, and different signals combined to form a combination signal. The combination signal is processed in the receiver in a matched filter wherein a radio channel impulse response is generated. The impulse response is processed further to locate the antenna branch that received the signal component. Of the signal components, those yielding the best power level are further allocated to be received by the finger branches of the RAKE receiver.

In accordance with the above, the signals received in the different antenna branches are delayed with respect to each other to prevent signal cancellation. Delaying the signals of the different antennas depends on time such that in an embodiment the delay of an antenna branch is increased between reception cycles. Herein, a reception cycle refers to part of the reception period of a matched filter, the reception period being the time from which the impulse response is generated. An upper limit is preferably set for the antenna delay, and the delay is not increased above said limit, and an upper limit under which the delay is not lowered. In this case, when the delay of a given antenna reaches the upper limit, for example, the sign of the direction of growth of the delay of that antenna branch is set to be negative, whereby the delay decreases until it reaches the lower limit.

The spread spectrum signals received in at least two branches and delayed in different ways are combined in a receiver to form a combination signal. One matched filter is used to generate a radio channel combination impulse response in the receiver from the combination signal. In this case the combination signal to be received with one matched filter includes a spread spectrum signal received from at least two antennas. The combination impulse response is preferably processed further by generating an antenna-specific impulse response for each antenna, enabling the location of the antenna that received the signal component in the combination impulse response. In order to distinguish between the antennas, said antenna delays have to be selected suitably to find the signal components of the desired antenna. Of the antenna impulse response signal components found, the best are allocated to be received by RAKE fingers. In this case, the RAKE fingers receive signal from the antenna from which the original spread spectrum signal was received. Thus the signal received by the RAKE fingers is an undelayed, not yet summed antenna signal.

The invention provides advantages. Because a spread spectrum signal received from two or more antenna branches is combined in the solution of the invention, one matched filter can simultaneously process a signal received from two or more antennas. This eliminates the processing delay associated with the change of antennas in the matched filter. Furthermore, the solution of the invention allows the averaging time of the calculation of the impulse response to be lengthened, resulting in a less probable loss of a signal in a fading channel than in using a short averaging time.

BRIEF DESCRIPTION OF THE FIGURES

In the following the invention will be described in greater detail by means of preferred embodiments with reference to the attached drawings, in which FIG. 6 shows an embodiment of a CDMA transmitter and receiver.

DETAILED DESCRIPTION OF THE INVENTION

Figure 1:
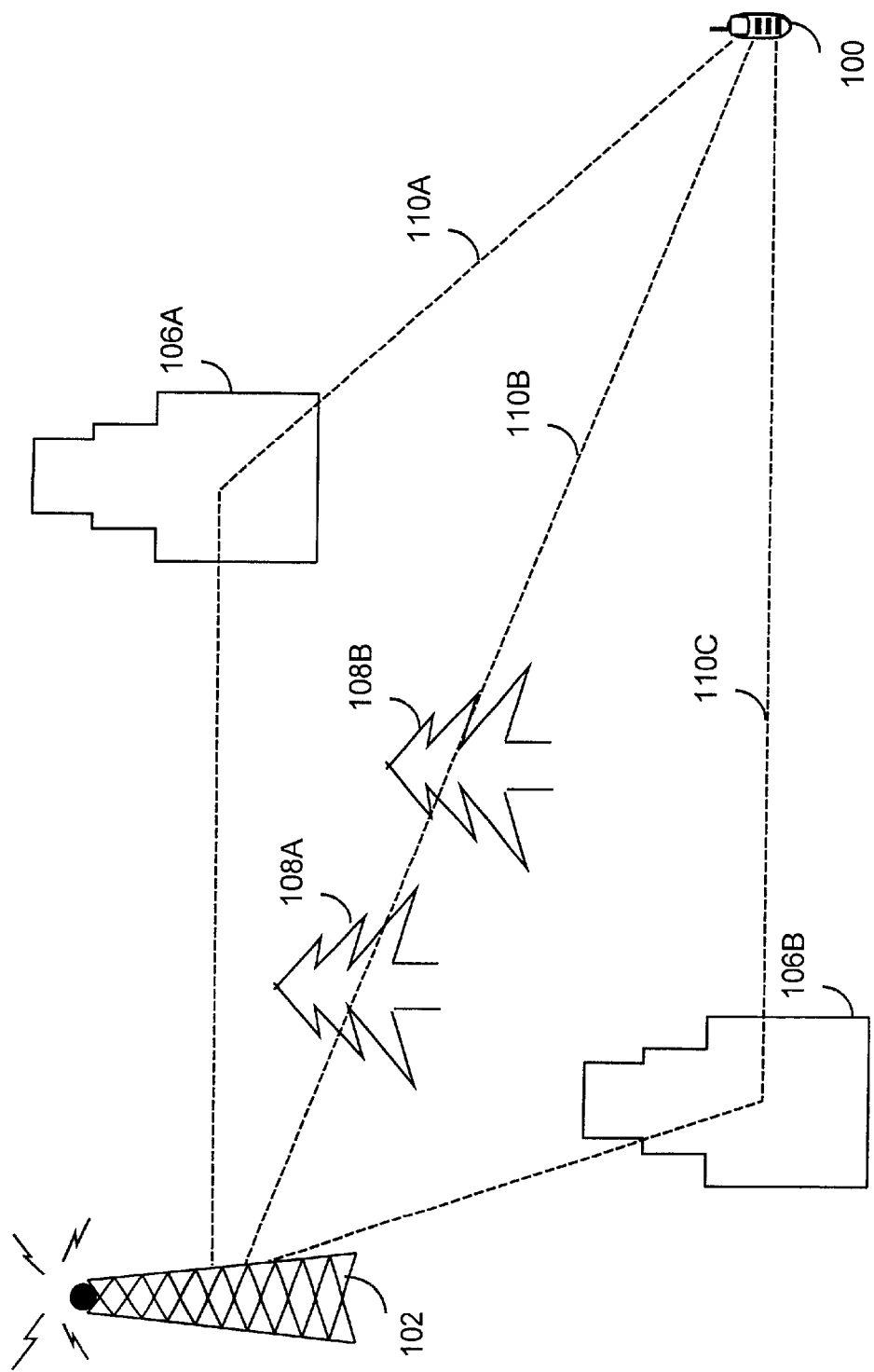
FIG. 1 shows multipath propagation of a radio signal between a mobile station and a base station.

In the following, the invention will be described by means of a mobile network employing CDMA. In CDMA systems, the data symbols of each user are multiplied by a pseudo-random spreading code, whereby the data signal to be transmitted is spread to a broad frequency band. A spreading code is usually composed of a long bit sequence, its bit rate being much higher than that of the data signal. During a connection, each user has available one or more spreading codes that are allocated to the user during connection set-up. Several users transmit simultaneously on the same frequency band, the data signals being distinguished from each other in the receivers on the basis of said spreading code. The attempt is to select orthogonal spreading codes, resulting in minimal interference caused by the transmissions of the different users to each other. However, in the receiver the signals of the different users interfere with each other, since the spreading codes are not completely orthogonal, particularly owing to a phase shift caused by the propagation time delay.

Information transfer between a base station and terminals, such as mobile stations, takes place on radio channels, which in the case of CDMA means a spreading code used in a given frequency band. Uplink refers to the flow of information from a terminal to a base station, whereas downlink refers to transmission from a base station to a terminal. In CDMA, uplink and downlink can be separated for example by means of frequency division duplex (FDD), whereby uplink and downlink are in different frequency ranges or by means of time division duplex (TDD), whereby transport directions are separated from one another in time. In the UMTS (Universal Mobile Telephony System) FDD mode, for example the following transport channels can be placed on physical channels: DCH is used to transfer both uplink and downlink user and control information between base stations and terminals. A broadcast channel (BCH) is used for downlink transfer of broadcast information, and a paging channel (PCH) is used to request for location data from a terminal in cases when the system is unaware of the location of the terminal. A forward access channel (FACH) is used for transmitting information to a terminal in cases when the base station is aware of the location of the terminal, and a terminal can use a random access channel (RACH) to transfer uplink control information associated with for example connection set-up, and the system can use a synchronization channel (SCH) to transfer synchronization information to terminals. Some radio channels were presented above by way of example, and the presentation of all of them is not relevant to the invention.

Transmission on radio channels takes place in fixed-form frame structures, which contain for example pilot symbols, user data and control information. Pilot symbols are a group of symbols known to both terminals and base stations. The party receiving information uses pilot symbols to generate a channel impulse response to find out the phase shift caused by the channel to the received complex-valued symbol. The impulse response is used in a receiver, for example in a RAKE type of receiver, to allocate a finger branch to the best signal components.

FIG. 1 shows a terminal 100 communicating on a bi-directional radio connection with a base station 102 of a mobile telephone network. Data between the terminal 100 and the base station 102 is transferred on the radio channels of the radio connection. Radio signal attenuation due to the distance 110B between the terminal 100 and the base station 102 is one of the reasons for the interference caused to the radio connection. Furthermore, a signal weakens due to shadowing when encountering terrain shapes, such as trees 108A to 108B. When being reflected from buildings 106A to 106B or the like, the signal causes multipath propagated signal components 110A, 110C to the receiver.

Figure 2:
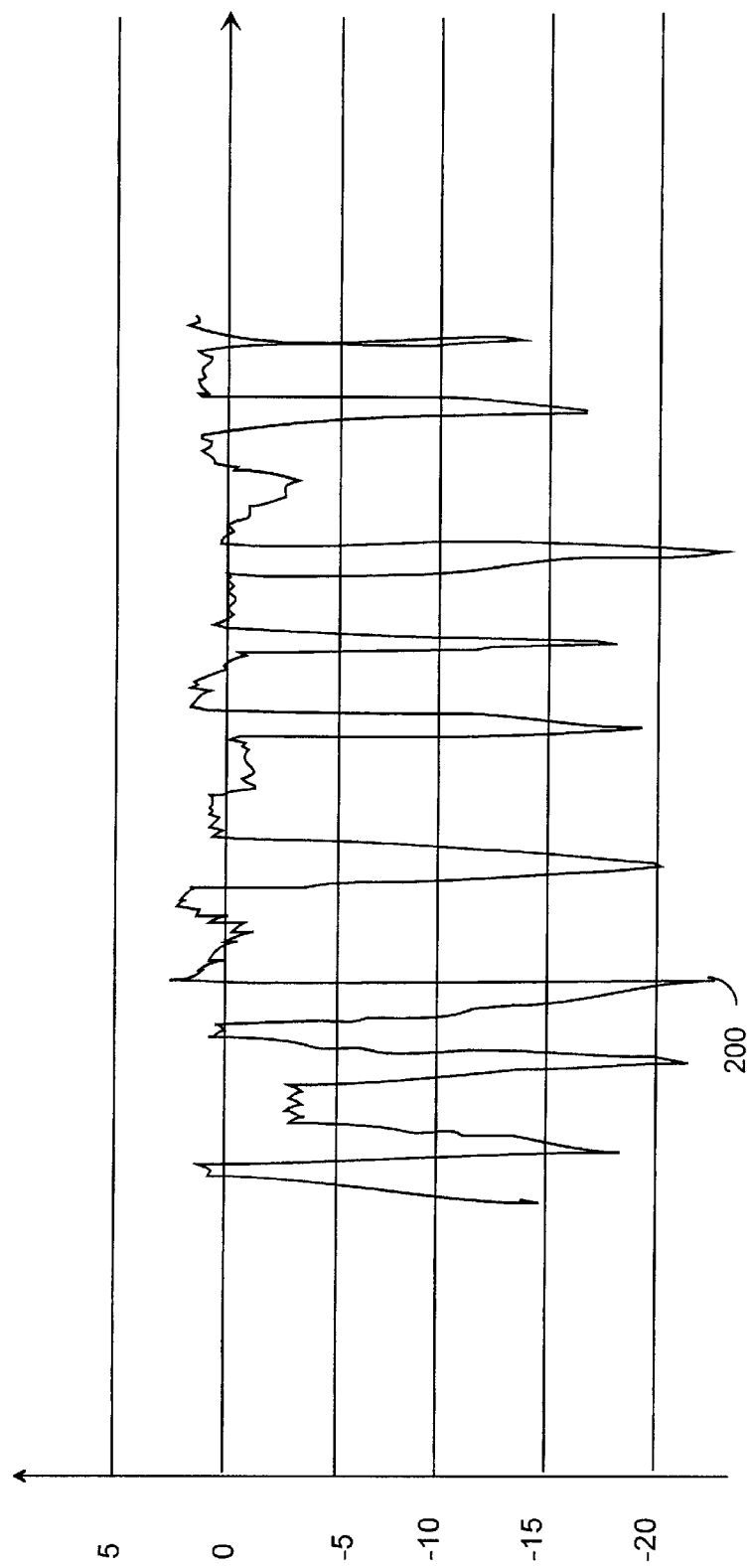
FIG. 2 shows an example of a fading radio channel.

FIG. 2 shows fading on a radio channel. The vertical axis shows signal strength in decibels as a function of the time shown on the horizontal axis. The reception power profile shows fading gaps 200 that impair the reception of information since breaks occur in the transmission. Unfavourable summing up of multipath propagated components is one of the reasons for fading. Interleaving is one of the protective measures against fading, wherein the information to be transmitted is divided into parts that are interleaved onto a longer span. In CDMA and TDMA hybrid systems, for example, interleaving is used to divide information into several bursts, whereby the loss of one burst is not crucial to the reception of the information. Channel coding, in turn, is used to code information to be transmitted by a known method, allowing the contents of the information fading in a fading gap to be deduced by decoding the channel coding. A spread spectrum signal can also be received in a receiver in two or more antennas, whereby the loss of a signal in one antenna because of fading is not crucial to the reception of the information.

Figure 3:
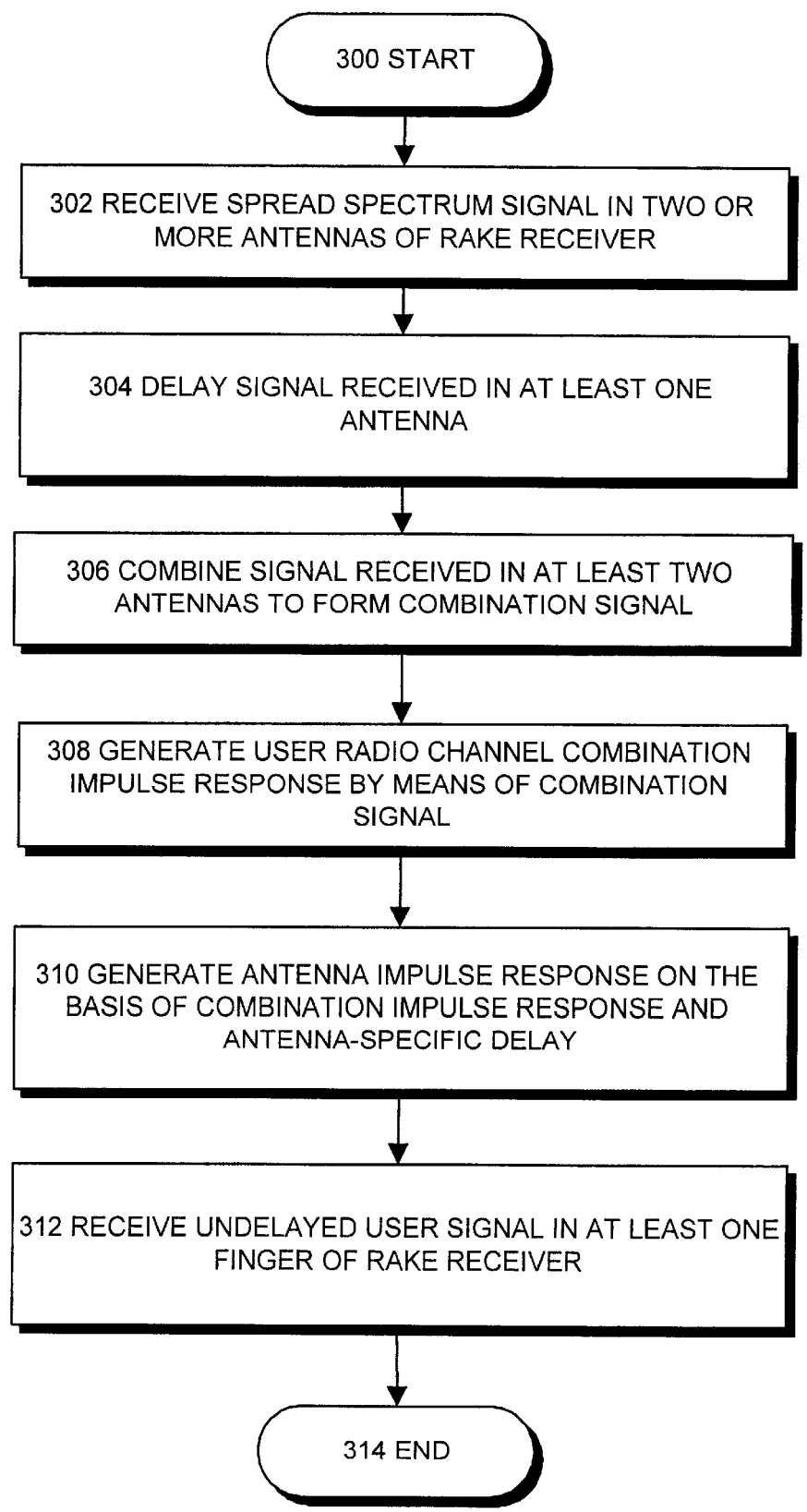
FIG. 3 shows an embodiment of the method of the invention.

FIG. 3 describes a preferred embodiment of the method of the invention. In step 302, a spread spectrum signal comprising user signals spread with several spreading codes is received. The spread spectrum signal is preferably received in a RAKE type of CDMA receiver, in which the signal is received in at least two antenna branches. In step 304, the signals, converted from analog to digital, of at least some antennas are delayed. In step 306, the signals received in at least two antennas are combined to form a combination signal. Hereby the combination signal comprises at least two signal components, delayed in different ways, of each user signal. In practice, the signal received from each antenna itself also comprises several multipath propagated user signal components. When the measuring period of the impulse response is divided into N sequences of the length of L chips, i=0, ..., N−1, a pre-summed antenna signal is generated for each sequence of the length of L chips in accordance with formula (4):

$$\tilde{\gamma}_i(t) = \sum_{a=0}^{N_a-1} \gamma^{(a)}(t - D_i^{(a)}), \qquad (4)$$

wherein $D_i^{(a)}$ is the delay used in the pre-summing and dependent on the sequence and the antenna. In a preferred embodiment, the antenna delays are increased or decreased at constant rates that are different for the different antennas. Limits are preferably set for the delays, i.e. if the delay becomes too long or too short, the delay is increased or decreased by changing the sign of the delay change. According to a preferred embodiment, the difference between antenna delays in each measuring period is at least one unit of a spreading code, i.e. a chip. The summed antenna signal is used in step 308 to generate a pre-summed impulse response in accordance with formula (5). The delay profile, i.e. the impulse response of the radio channel is preferably generated by means of a matched filter. The length of the matched filter, i.e. the value of L in formula (5) is in some embodiments for example 8, 16 or 32 chips. The matched filter is shifted over the received signal and, when the pilot signal section in the matched filter correlates with the combination signal, the taps of the impulse response can be located.

$$\tilde{P}_i(t) = \left| \frac{1}{L} \sum_{j=0}^{L-1} \tilde{y}_i((iL+j)T_c + t) c_{iL+j}^* \right|^\alpha. \quad (5)$$

In a preferred embodiment of the invention, the combination signal is thus processed in only one matched filter. In a preferred embodiment of the invention, the matched filter is so time divided that signals of different users are received alternately based on the combination signal. Hereby, for example user 1 is processed in the matched filter during 100 ms from the combination signal, after which user 2 is processed during a corresponding time until, after a given number of users, user 1 is again next in turn.

An approximate estimate is that the combination impulse response of the combination signal mentioned in formula (5) is substantially congruent with the sum of the antenna impulse responses measured from individual antennas in accordance with formula (6):

$$\tilde{P}_i(t) \approx \sum_{a=0}^{N_a-1} P_i^{(a)}(t - D_i^{(a)}). \quad (6)$$

Step 310 utilizes the combination impulse response generated in step 308. To use the impulse response generated from the combination signal in RAKE fingers, the antenna branch in which the signal component indicated by the impulse response was received has to be deduced from the impulse response. The antenna impulse response of an individual antenna can be estimated by the sum:

$$P^{(a)}(t) \approx \frac{1}{N} \sum_{i=0}^{N-1} \tilde{P}_i(t + D_i^{(a)}), \quad (7)$$

whereby the delays used by said antenna in different measuring periods are utilized to search the combination impulse response for the components of a given antenna that can be allocated further to be received by the RAKE fingers. Once the best components, as far as the user is concerned, are located in the combination impulse response and when the antenna that received said component is found, the signal component can be allocated to a RAKE finger for reception in accordance with step 312.

Figure 4:
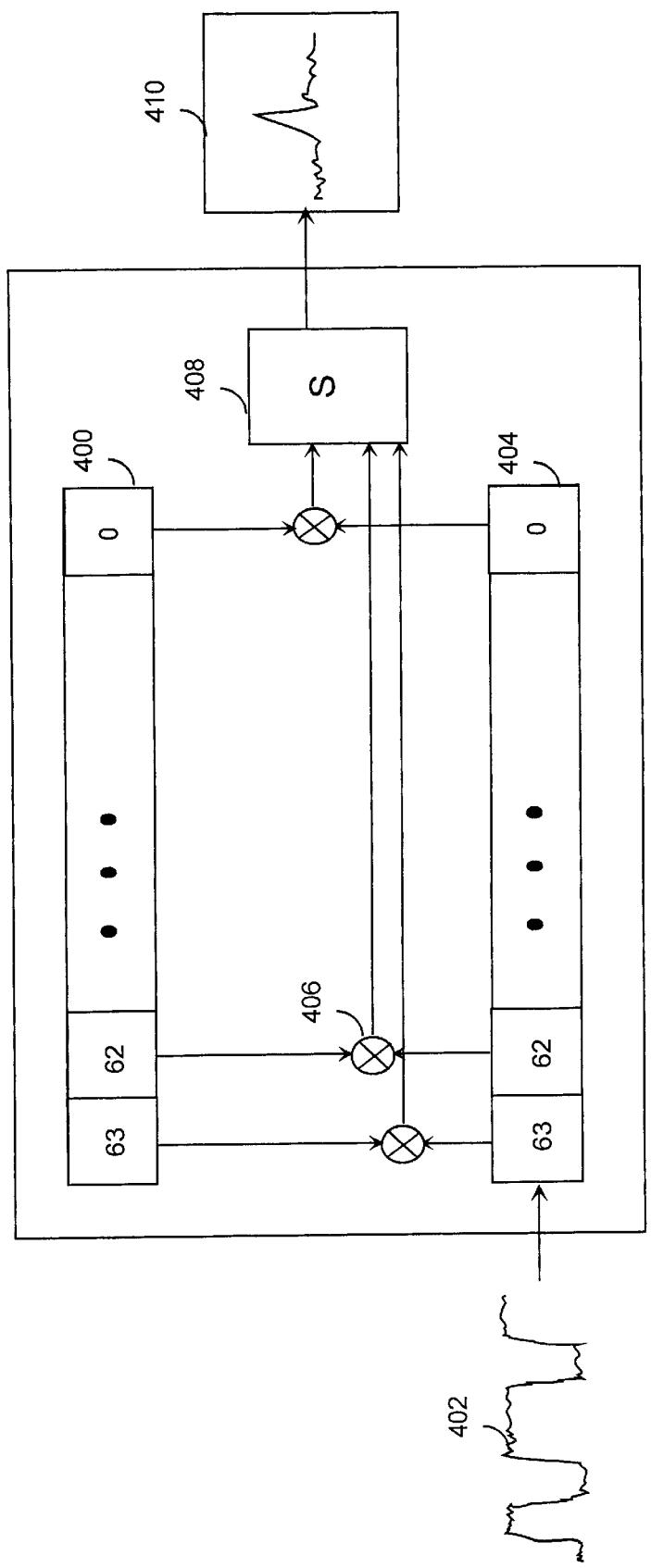
FIG. 4 shows an embodiment of a matched filter.

FIG. 4 illustrates a matched filter, to which reference was made in the description of FIG. 3. FIG. 4 shows a matched filter 400 divided into 64 parts representing 64 chips. A signal sample generated from pilot signals by the user's spreading code is stored in the matched filter 400. A corresponding signal sample 404 of the length of 64 chips is generated from the received combination signal 402. The signal sample 404 is correlated 406 a chip at a time with the signal sample in the matched filter 400. The correlation values generated are summed up in an adder 408, whose output is an impulse response graph 410, in which components having different reception powers are shown at different delays. The matched filter 400 is shifted over the signal thus received until the best value in the adder 408 is found.

Figure 5:
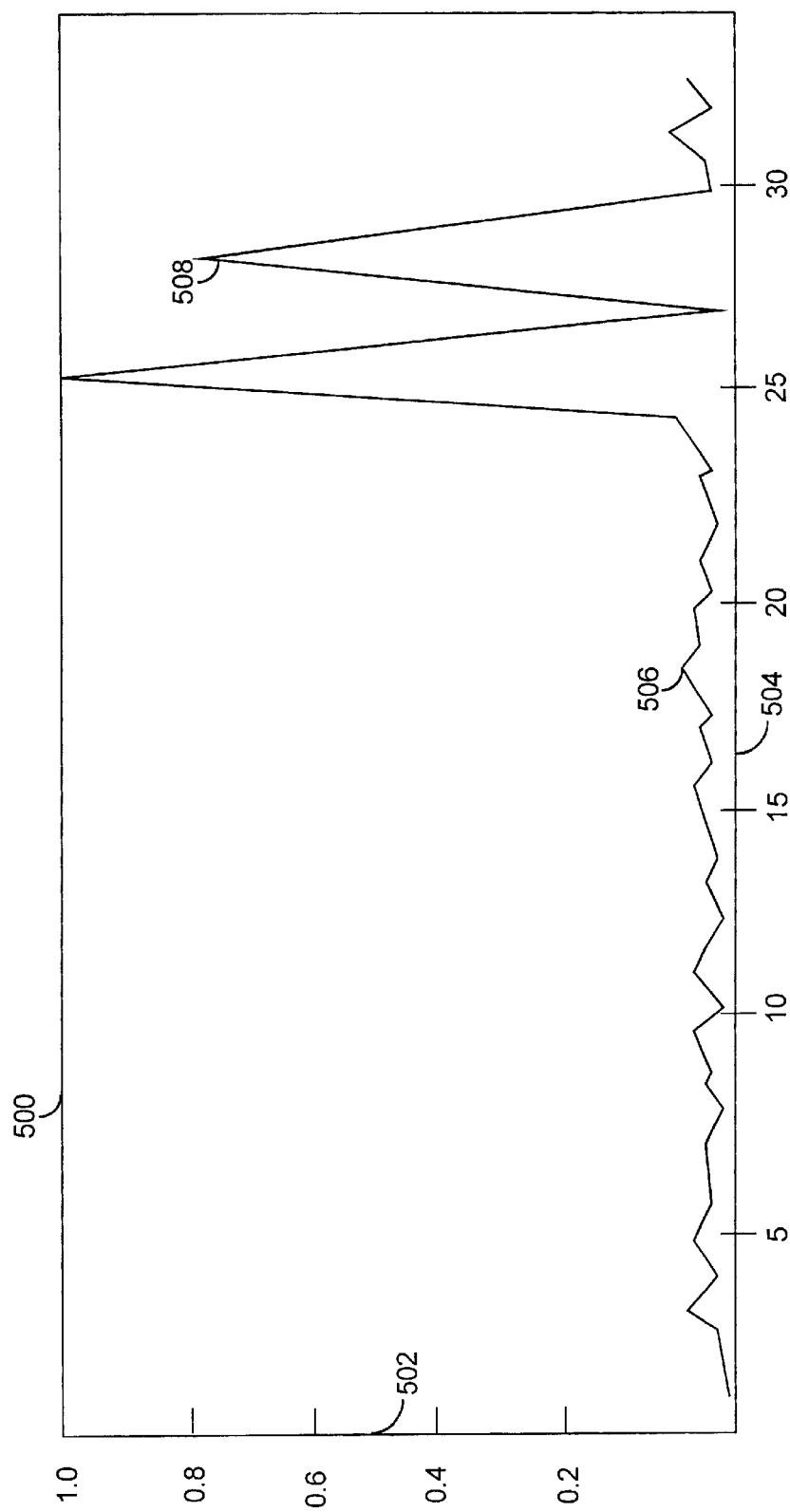
FIG. 5 shows an example of a radio channel impulse response.

FIG. 5 shows an example of an impulse response graph, adapted to a 32-chip matched filter 500. The Y-axis 502 shows signal energy, whereas the X-axis 504 shows signal components delays inside a 32-chip matched filter. Graph 506 thus depicts the energy of the impulse response proportioned to the location of the matched filter in chips. The figure shows that two peaks, 508A and 508B, which could be allocated to RAKE fingers for monitoring, stand out from the impulse response graph.

FIG. 6 is a general description of the operation of a radio transmitter/radio receiver pair in the CDMA mobile system. The radio transmitter can be located in a base station or in a subscriber terminal, as can the radio receiver. The top of FIG. 6 shows the essential functions of a radio transmitter and the lowest part the schematic structure of functions carried out on the data of the radio receiver to be transmitted. Information 600 to be transmitted is coded in a channel coder 602 for example by block coding or convolution coding. However, pilot bits to be transmitted are not channel coded, since the intention is to find out the distortions caused by the channel to the signal. After channel coding, the information is interleaved in an interleaver 604. In interleaving, the bits of different services are mixed with each other in a certain way, whereby a momentary fading on the radio path does not necessarily render the transferred information unidentifiable. Interleaved bits are spread by a spreading code in block 606. Finally the combined signal is applied to radio frequency parts 610 that may comprise different power amplifiers and filters for limiting the bandwidth. An analog radio signal is transmitted via an antenna 610 to the radio path.

The analog radio frequency signal is received from the radio path 612 with an antenna 614. The signal is applied to radio frequency parts 616, which comprise e.g. a filter for blocking out frequencies outside the desired frequency band. The spreading of the received signal is removed in block 618, and the interleaving is removed in deinterleaving means 620. The channel coding used in the transmission is decoded in a channel decoder block 622, whereby the received data 624 is decoded and, in an optimal situation, is congruent with the transmitted data 600.

Figure 7A:
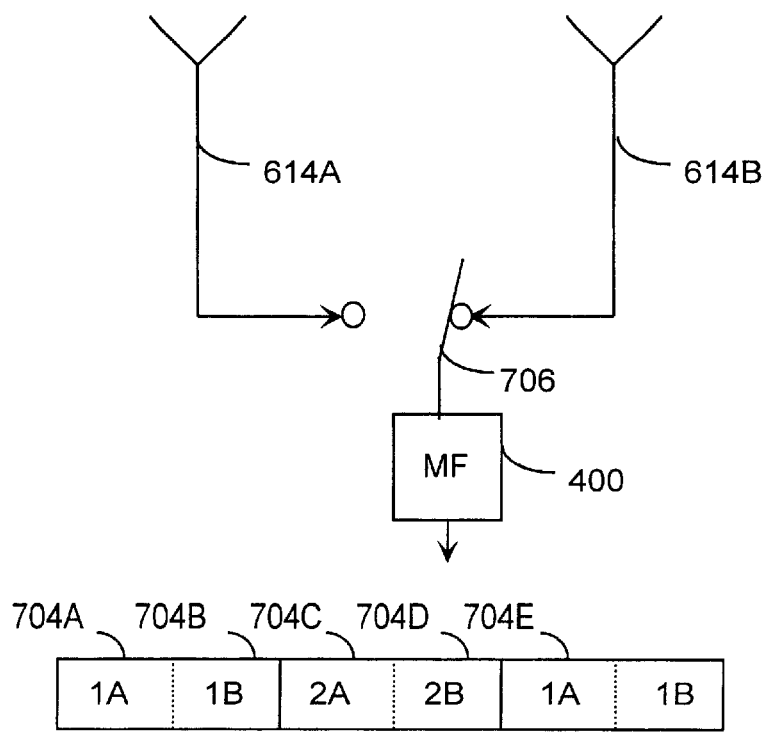
FIG. 7A shows a prior art receiver.
Figure 7B:
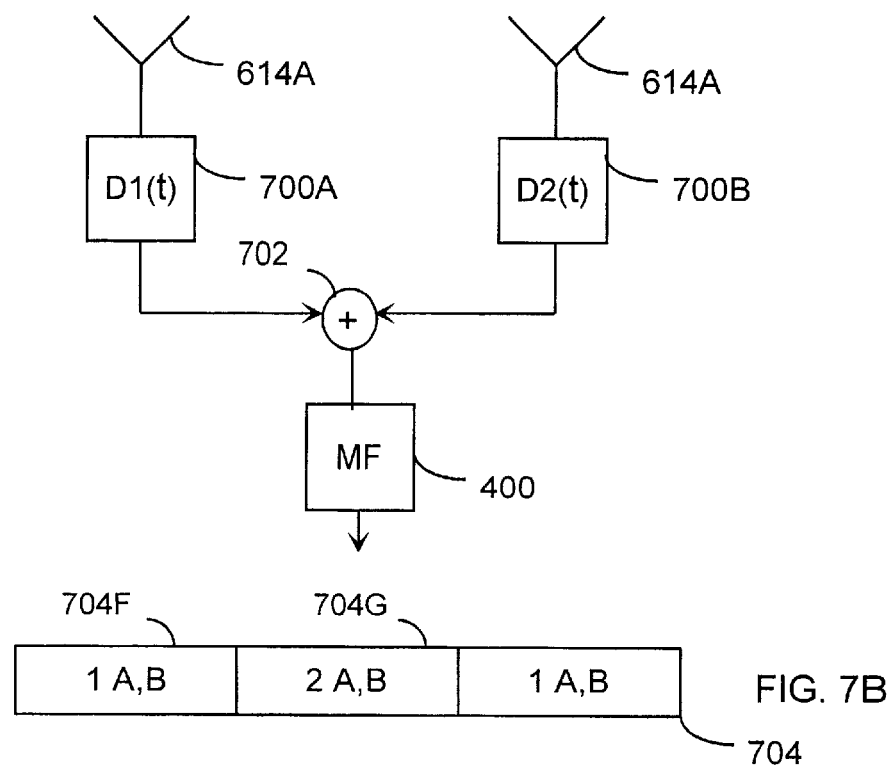
FIG. 7B shows the receiver of an embodiment of the invention.

FIG. 7A shows a prior art receiver for receiving a spread spectrum signal, and FIG. 7B the receiver of an embodiment of the invention. It is obvious that a receiver also comprises other parts than those shown in FIGS. 7A and 7B, but their presentation in the figures is not essential to explaining the invention. The receiver shown in FIG. 7A comprises antenna A 614A and antenna B 614B. The matched filter 400 operates time dividedly by receiving the spread spectrum signal alternately by means of a switch 706. The time division is presented in a time division profile 704, according to which the impulse response of user 1 is measured in timeslot 704A along antenna A, and in timeslot 704B along antenna B. The impulse response of user 2 is measured in timeslots 704C to 704D, and again, in the next timeslot 704E, the impulse response of user 1 in antenna A. The length of each timeslot 704A to 704E is t. The structure of a second prior art receiver is such that the matched filter is not time divided, but there is a matched filter corresponding to each antenna branch.

In the receiver shown in FIG. 7B, a spread spectrum signal is also received in two antennas: antenna A 614A and antenna B 614B. The signal received in antenna A is delayed in delay unit 700A and the signal received in antenna B in delay unit 700B. The delay of the delay units depends on time, i.e. the delay varies as a function of time. In a preferred embodiment, the mutual delay difference between the antenna branches is at least one unit of a spreading code, i.e. a chip. The signals received in antennas A and B are combined in a combiner 702 before being applied to the matched filter 400. In a preferred embodiment, the matched filter 400 is time divided, whereby the signal of user 1, combined from antennas A and B in the time division profile 704, is received in timeslot 704F, and the combined signal of user 2 is received in timeslot 704G. In this case the length of each timeslot is 2t, i.e. twice the length of a timeslot in a prior art time divided matched filter.

Figure 8:
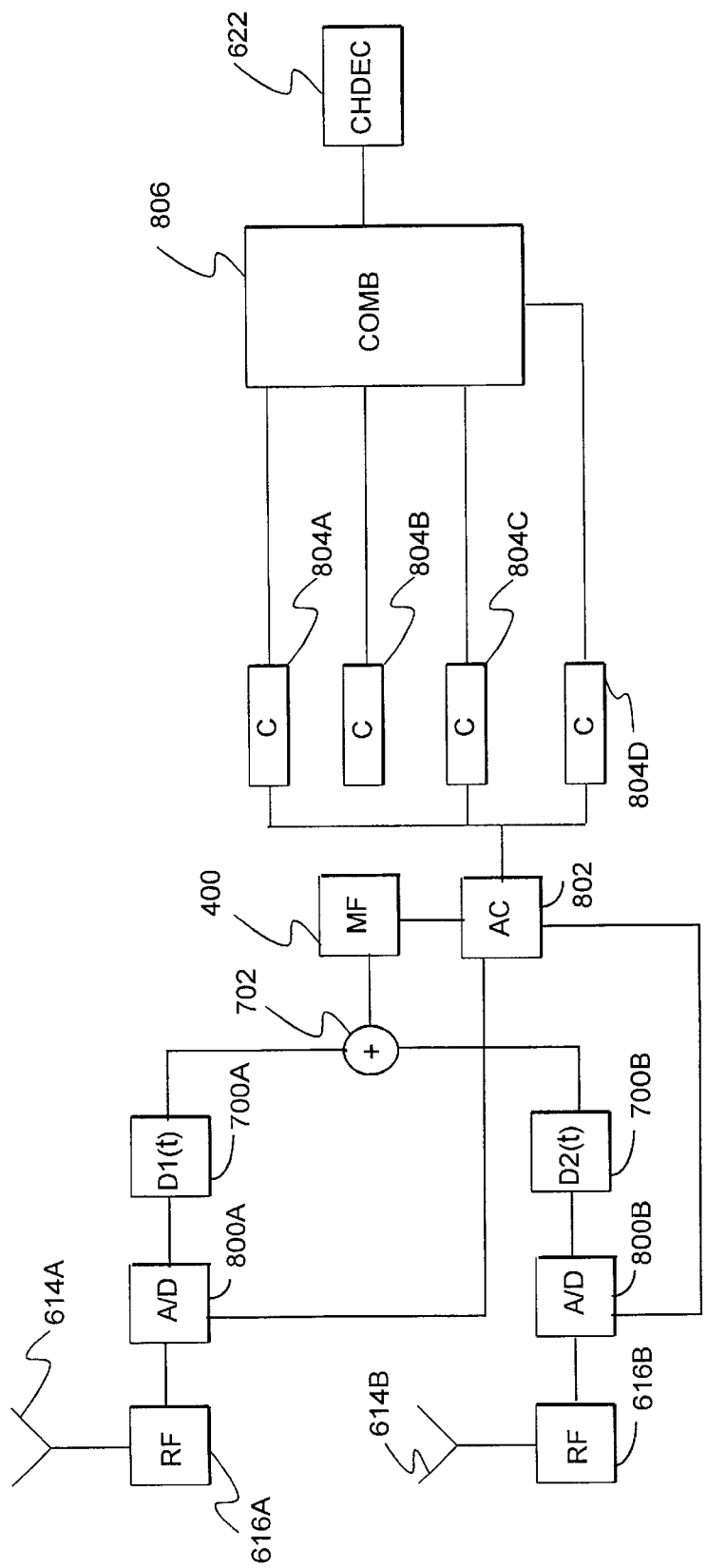
FIG. 8 shows an embodiment of the receiver of the invention.

FIG. 8 shows the receiver according to a preferred embodiment of the invention. The CDMA receiver comprises two antennas 614A to 614B for receiving a broadband signal. From antennas 614A to 614B the signal is applied to corresponding radio frequency parts 616A to 616B, from which the signal is applied to corresponding A/D converters 800A to 800B for conversion from analog to digital form. The signals received from both antennas 614A and 614B have a delay unit 700A and 700B, respectively. In the delay unit, the signal received in the antenna is delayed depending on time, as was described in connection with FIG. 3. The digital, broadband signals are combined in a combiner 702 to form a combination signal. The combination signal is directed to the matched filter 400, in which impulse responses for users' radio channels are generated. The delayed antenna signals are only used in the generation of the impulse response, and the undelayed signals obtained from the A/D converters are applied to an antenna controller 802. The antenna controller 802 preferably also coordinates delay units 700A to 700B and the delays used by them, whereby the relationship between the delays used by delay units 700A to 700B is known and controlled by one unit. The antenna controller 802 is in connection to the matched filter and obtains from the filter an impulse response generated on the basis of the combination signal. The antenna controller 802 uses the impulse response to locate the antenna of the signal component in the impulse response, such as antenna 616B. Hereby a signal component received in antenna 616B may be applied to one of the correlators 804A to 804D. The RAKE fingers report to the antenna controller 802 if they lose a signal component they are monitoring or if the signal components monitored by different fingers merge. In such a case, the antenna controller 802 reallocates the RAKE fingers. Reallocation may also be periodic or take place when changes occur in the impulse response. The signal components monitored by the different RAKE fingers are combined in an adder 806, in which weighting can also be performed on the basis of the strengths of the signal components. After the adder, the signal is applied to a channel decoder 622. It is obvious that a RAKE receiver also comprises other hardware parts and functionalities than those presented in FIG. 8, but their presentation is not essential to the invention.

The invention is preferably implemented by software with a general-purpose processor in the receiver. The invention may naturally also be implemented by hardware solutions offering the required functionality, e.g. ASIC (Application Specific Integrated Circuit) or separate logics components.

Although the invention was described above with reference to the example according to the accompanying drawings, it is obvious that the invention is not restricted thereto, but can be modified in a variety of ways within the inventive idea disclosed in the attached claims.

What is claimed is:

1. A method of receiving a spread spectrum signal in a cellular radio network, comprising:

receiving a spread spectrum signal containing several user signals in two or more antennas of a receiver in a cellular radio network;

delaying the spread spectrum signal received in at least one antenna to prevent the spread spectrum signals received from the different antennas from being cancelled;

combining the spread spectrum signal received in at least two antennas to form a combination signal;

generating a user signal combination impulse response by means of the combination signal;

generating an antenna-specific user signal antenna impulse response on the basis of the combination impulse response and an antenna-specific delay; and allocating one or more signal components indicated by the antenna impulse response undelayed to be received by one or more fingers of the receiver.

2. A method as claimed in claim 1, wherein the receiver is a RAKE receiver.

3. A method as claimed in claim 1, further comprising the step of changing the delay of the spread spectrum signal to be received from an antenna as a function of time.

4. A method as claimed in claim 3, further comprising the step of setting an upper limit and a lower limit for the delay of the spread spectrum signal to be received from an antenna, and changing the growth direction of a delay that reaches the upper or the lower limit.

5. A method as claimed in claim 1, further comprising the step of changing the delay of the spread spectrum signal to be received from an antenna at a constant rate as a function of time.

6. A method as claimed in claim 1, further comprising the step of delaying each antenna at a different delay at each reception moment.

7. A method as claimed in claim 1, further comprising the step of generating the user signal combination impulse response by comparing a signal sample of a matched filter of the receiver with the spread spectrum signal received.

8. A method as claimed in claim 1, further comprising the step of generating the user signal combination impulse response by means of one matched filter of the receiver.

9. A method as claimed in claim 1, further comprising the step of measuring the user signal combination impulse response from said two or more antennas time dividedly in reception timeslots by receiving the user signal from at least two antennas of the receiver during one reception timeslot.

10. A RAKE receiver for receiving a spread spectrum signal, comprising:

at least two antennas for receiving a spread spectrum signal containing several user signals;

at least one delay unit for delaying the spread spectrum signal received in at least one antenna to prevent the spread spectrum signals received from the different antennas from being cancelled;

an adder for combining the spread spectrum signal received in at least two antennas to form a combination signal;

a matched filter for generating a user signal combination impulse response by means of the combination signal;

means for generating an antenna-specific user signal antenna impulse response on the basis of the combination impulse response and an antenna-specific delay; and an antenna coordinator for allocating one or more signal components indicated by the antenna impulse response undelayed to be received by one or more fingers of the receiver.

11. A RAKE receiver as claimed in claim 10, wherein the RAKE receiver is arranged to change the delay of the spread spectrum signal to be received from an antenna as a function of time.

12. A RAKE receiver as claimed in claim 10, wherein the RAKE receiver is arranged to change the delay of the spread spectrum signal to be received from an antenna at a constant rate as a function of time.

13. A RAKE receiver as claimed in claim 12, wherein the RAKE receiver is arranged to set an upper limit and a lower limit for the delay of the spread spectrum signal to be received from an antenna, and to change the growth direction of a delay that reaches the upper or the lower limit.

14. A RAKE receiver as claimed in claim 10, wherein the RAKE receiver is arranged to delay each antenna at a different delay at each reception moment.

15. A RAKE receiver as claimed in claim 10, wherein the RAKE receiver is arranged to generate the user signal combination impulse response by comparing a signal sample of the matched filter of the receiver with the spread spectrum signal received.

16. A RAKE receiver as claimed in claim 10, wherein the RAKE receiver is arranged to generate the user signal combination impulse response by means of one matched filter of the receiver.

17. A RAKE receiver as claimed in claim 10, wherein the RAKE receiver is arranged to measure the user signal combination impulse response from said two or more antennas time dividedly in reception timeslots by receiving the user signal from at least two antennas of the receiver during one reception timeslot.

* * * * *